Figure 4:
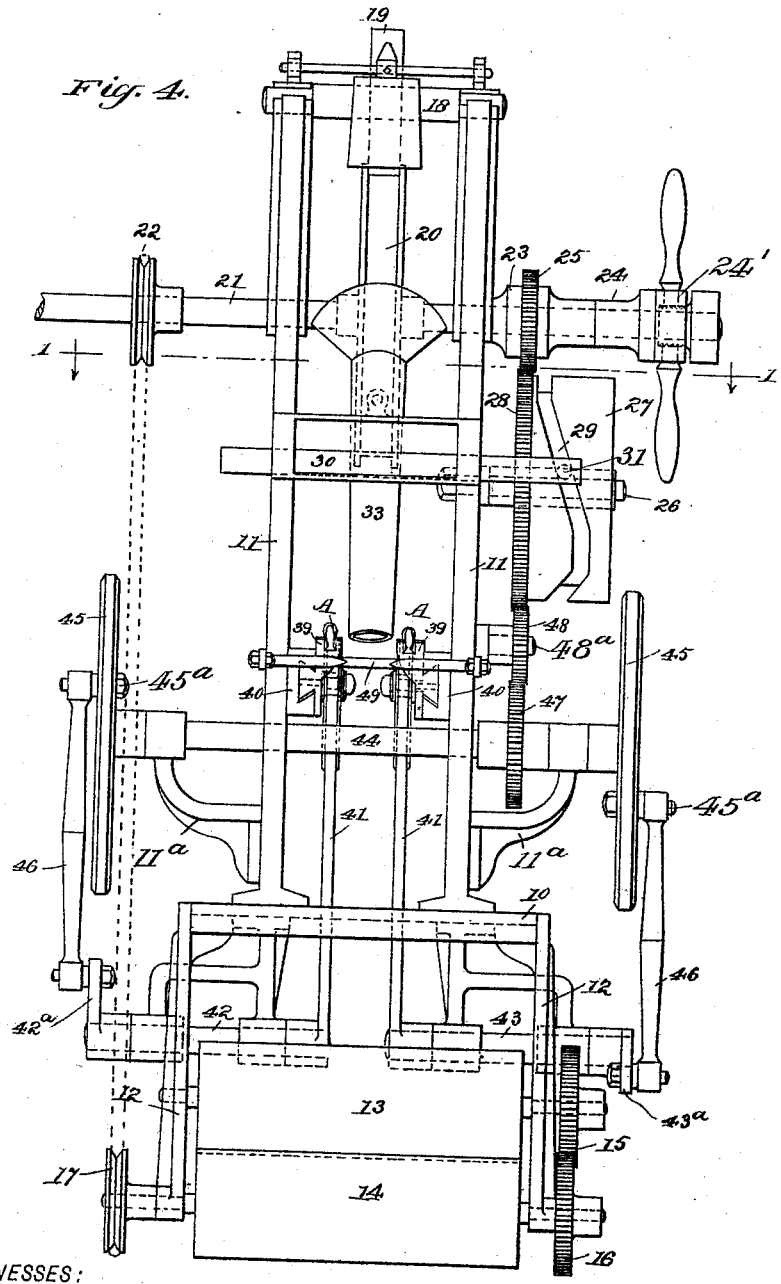

(No Model.) 2 Sheets—Sheet 1.
W. A. DENN.
MACHINE FOR LINKING AND DOUBLE LINKING WARPS.
No. 460,098. Patented Sept. 22, 1891.
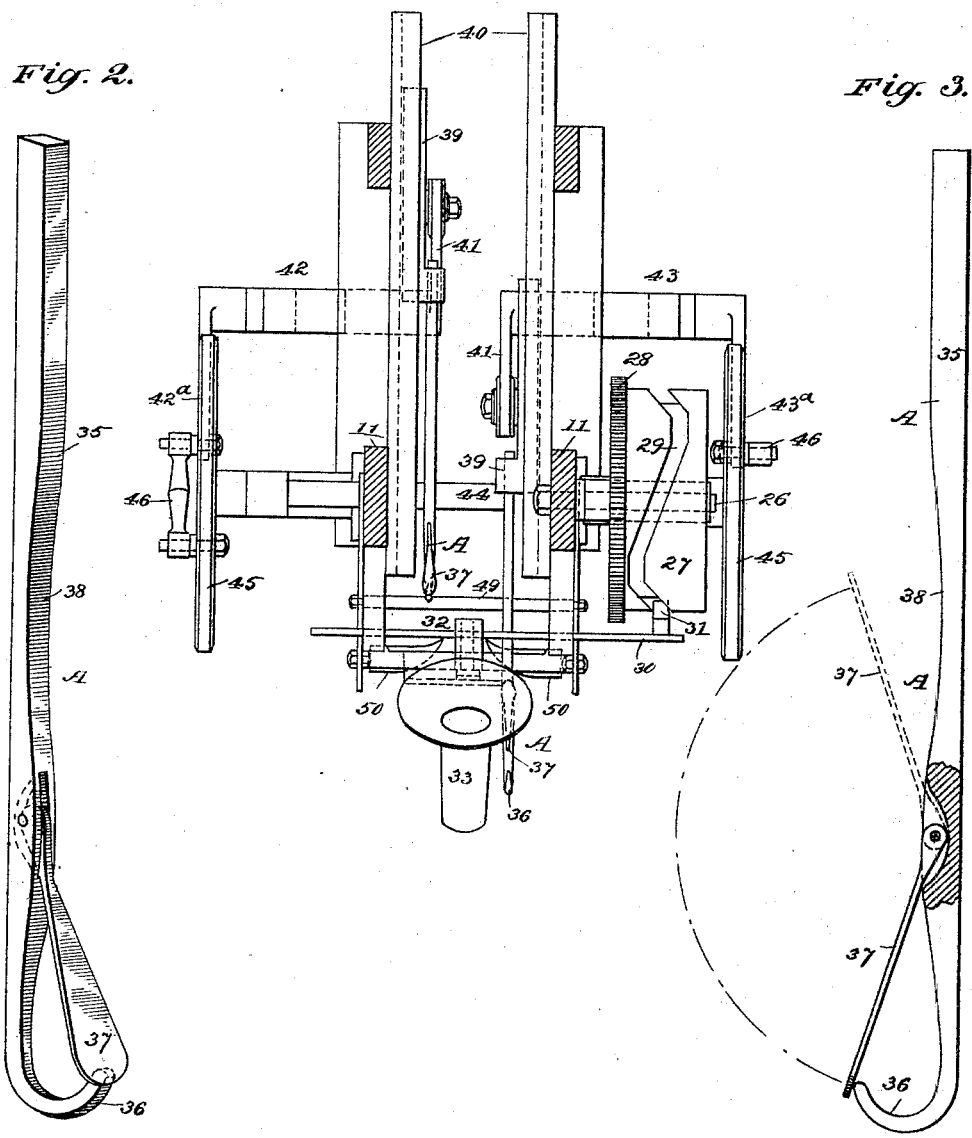
WITNESSES:
J. A. Criswell
C. Sedgwick
INVENTOR:
W. A. Denn
BY Munn & Co.
ATTORNEYS (No Model.) 2 Sheets—Sheet 2.

W. A. DENN.
MACHINE FOR LINKING AND DOUBLE LINKING WARPS.

No. 460,098. Patented Sept. 22, 1891.

WITNESSES:

INVENTOR:
W. A. Denn
BY Munn & Co.
ATTORNEYS

UNITED STATES PATENT OFFICE.

WILLIAM A. DENN, OF PHILADELPHIA, PENNSYLVANIA.

MACHINE FOR LINKING AND DOUBLE LINKING WARPS.

SPECIFICATION forming part of Letters Patent No. 460,098, dated September 22, 1891.

Application filed May 23, 1890. Serial No. 352,905. (No model.)

*To all whom it may concern:*

Be it known that I, WILLIAM A. DENN, of Philadelphia, in the county of Philadelphia and State of Pennsylvania, have invented a new and Improved Machine for Linking and Double Linking Warps, of which the following is a full, clear, and exact description.

My invention relates to machines for looping and double looping or linking warps, and has for its object to provide a needle which will operate as effectually with small as with large warps, and also to provide a means for automatically producing the links of the warp, the said machine being especially adapted for use in connection with the warp-linking machine for which Letters Patent were granted to Clayton Denn, dated July 23, 1889, and numbered 407,514, and on machines of a like character.

The invention consists in the novel construction and combination of the several parts, as will be hereinafter fully set forth, and pointed out in the claims.

Reference is to be had to the accompanying drawings, forming a part of this specification, in which similar figures of reference indicate corresponding parts in all the views.

Figure 1 is a plan view of the invention as embodied in a warp-linking machine, the inner portion of said machine being shown, and the machine is illustrated partially in horizontal section, the section being taken on the line 1 1 of Fig. 4. Fig. 2 is a perspective view of the needle detached. Fig. 3 is a side elevation of the needle, a portion being broken away; and Fig. 4 is a front elevation of that portion of the machine adapted to co-operate with the needle.

Upon the base 10 uprights 11 are supported, the said base being provided with downwardly-extending arms 12 at its ends, in which arms the trunnions of contacting friction rollers or drums 13 14 are journaled. The trunnions of the said friction-drums at one side are provided with meshing-gears 15 and 16, as best shown in Fig. 4, and the opposite trunnion of the lower drum 14 has attached thereto a drive-pulley 17. Upon the top of the uprights 11 a shaft 18 is journaled, having attached thereto a calender-roll 19, which roll contacts with the peripheral surface of a flanged pulley 20, which pulley is secured to the main or drive shaft 21. The drive-shaft 21 has secured thereto near one end a pulley 22, adapted to be belted with the pulley 17, and near the opposite end of the drive-shaft 21 a collar 23 is keyed thereon, and a friction-clutch 24 is mounted upon the shaft in front of the collar, and between the friction-clutch and the collar a pinion 25 is loosely mounted upon the drive-shaft, which pinion is rotated by the shaft when held in close contact between the shaft-collar and the clutch. The friction-clutch 24 is forced against the hub of pinion 25 by means of the handled nut 24', mounted on the outer threaded end of the shaft 21. Below the clutch a spindle 26 is projected horizontally from one of the uprights 11, upon which spindle a wheel 27 held to revolve, provided with an attached gear 28 upon its inner face adapted to mesh with the pinion 25 and having a cam-groove 29 produced in its periphery. A cam-bar 30 is held to laterally reciprocate in the uprights, movement being imparted thereto through the medium of a friction-wheel 31 attached at one end, which friction-wheel travels in the cam-groove 29 of the wheel 27.

At or near the center of the cam rod or bar 30 a post 32 is secured, (best shown in Fig. 1,) which post is pivotally attached at its upper end to a warp-distributing tube or horn 33, of the usual construction, and the said tube or horn has a downward and outward inclination, as indicated in Fig. 1, and by reason of its connection with the cam-bar 30 a reciprocating movement is imparted thereto. The calender-roll and flanged pulley 20 are adapted for imparting a tension upon the warp as it is delivered therefrom to the tube or horn 33. After passing through the tube or horn the warp is caught by the latch-needles A, two of which are ordinarily employed, adapted to reciprocate longitudinally in opposite directions.

The specific construction of the needles is best shown in Figs. 2 and 3. The said needles consist each of a shank or body portion 35, one end of which shank or body portion is somewhat reduced in thickness and curved upward to form a hook 36. A slight distance back of the hook in the upper edge of the needle one end of a retaining-plate 37 is pivoted, the said plate being preferably widest at its free end, and at said end is adapted to normally engage with the extremity of the hook 36, as shown in positive lines in Figs. 2 and 3; but the shank of the needle is so slotted around the pivotal point of the retaining-plate that the said plate may be thrown back to the inclined position illustrated in dotted lines, Fig. 3, thereby entirely exposing the hook-section 36 of the needle. Immediately at the rear of the pivotal point of the retaining-plate the upper edge of the needle is concaved, as best shown at 38 in Figs. 2 and 3.

The needles are attached rigidly to cross-heads 39 in any suitable or approved manner, the attachment of the needle being preferably made at its inner extremity, and the said cross-heads are capable of horizontal movement in slideways 40, attached to the opposed inner faces of the uprights 11, some distance below the cam-bar 30, and the needles are so secured that their retaining-plates 37 will be uppermost.

The needles are reciprocated longitudinally in opposite directions through the medium of crank-arms 41, connected with a slide, preferably by a pin-and-slot connection, at or near the rear of the cross-heads. One crank-arm is attached to the inner extremity of a rock-shaft 42, and the other in similar manner to an aligning rock-shaft 43. Motion is imparted to the rock-shafts 42 and 43 from a counter-shaft 44 above them, journaled in the uprights 11 and brackets 11$^a$ projected from the same, which counter-shaft has attached to each end a wheel 45, each wheel being provided with a suitably-located wrist-pin 45$^a$, and a connection between the wrist-pins of the wheels and the crank-arms 42$^a$ and 43$^a$ on the outer extremities of the rock-shafts is effected through the medium of pitmen 46. The counter-shaft 44 is also provided with an attached gear-wheel 47, which meshes with a pinion 48, journaled upon a suitable spindle 48$^a$, attached to one of the uprights, which pinion 48 also meshes with the gear 28 of the cam-wheel 27. Thus each portion of the machine represented is driven from the main shaft 21, and the said shaft may be revolved without communicating motion to any of the parts beneath it, except the parts operated from pulleys 22 to 17, when the friction-clutch 24 is manipulated to permit the pinion 25 to turn loosely upon the said drive-shaft.

In front of the slideways 40 a trip-bar 49 is transversely and rigidly secured to the uprights 11, the said trip-bar being below the path of the needles, and to the outer face of each upright 11 a stripping-finger 50 is secured, the said fingers being curved inward at their inner ends, as best shown in Fig. 1, and the said fingers are of such length that quite a space is made to intervene their opposed surfaces. The fingers 50 are in horizontal alignment with the trip-bar 49, as shown in Fig. 4, and each of the said fingers extends transversely across, yet below, the line of travel of the needle.

The operation of making the link or loop is best observed by reference to Fig. 1. After the needle is threaded the warp is passed down and held tight between the drums 13 and 14, whereupon, when the needle moves far enough forward to bring the warp in contact with the stripping-finger beneath it, the warp is held stationary and the needle continues forward to the end of its stroke, the natural result being that the retaining-plate is forced back, uncovering the hook of the needle by the warp under tension. The horn 33 in the meantime has moved across the needle immediately back of the hook, and as the needle moves backward upon its return stroke that portion of the warp which has been forced back over the plate by the stripping-fingers is again held stationary by the trip-bar 49, and as the needle moves farther rearward the warp upon its body pushes the retaining-plate over the hook, thereby inclosing the warp deposited there when the needle was in its forward position. This movement permits that portion of the warp back of the latch to slip over the warp in the hook, forming thereby a link or loop. Two needles moving in opposite directions are usually employed, in which event a double loop or link is obtained. The nut 24' may be turned to release the clutch 24 from the gear 25, in which case the linking mechanism connected with said gear will not be operated, and this permits the stopping the linker at the end of the warp and running a few yards through without linking for the purpose of tying the warps up when finished.

Having thus described my invention, I claim as new and desire to secure by Letters Patent—

1. The combination, with the warp-distributing horn, its operating mechanism, and a horizontally-reciprocating cross-head below the horn, of a linking-needle rigidly secured at its inner end to the cross-head, having an upward hooked outer end, and a vertically-swinging latch-plate closing the hook and resting at its free end on the extremity thereof, substantially as set forth.

2. The combination, with the main shaft having a loose gear-wheel and a clutch for connecting the shaft and gear, the horn, means for operating the horn, and the linking-needles having gearing connected with the said main-shaft gear, of the rolls 13 14, geared together below the linking-needles and belted to the main drive-shaft, whereby the rolls will continue to rotate upon the stopping of the linking mechanism, substantially as set forth.

3. In a warp-linking machine, the combination, with a reciprocating distributing-horn, a stationary trip-bar located beneath the horn, and an inwardly-curved stripping-finger located in front of the trip-bar, of a linking-needle held to longitudinally reciprocate above the trip-bar and stripping-finger and below the path of the distributing-horn, the said needle consisting of a body portion having a hook formed at one end, and a retaining-plate pivoted in the said body portion and capable of movement to and from the hook, as and for the purpose specified.

4. In a warp-linking machine, the combination, with a reciprocating distributing-horn, a stationary trip-bar located beneath said horn, and inwardly-curved stripping-fingers in front of the said bar, one located near each end, of linking-needles capable of longitudinal reciprocation alternately in opposite directions, the said needles located below the path of the distributing-horn and above the trip-bar and stripping-fingers, each needle consisting of a body provided with a hook at one end, a concaved surface between the center and the hook, and a retaining-plate pivoted at one end beneath the said concaved surface and the hook and capable of folding over one or the other, as and for the purpose specified.

5. The combination, in a warp-linker, with the horn and its operating mechanism, of a horizontal longitudinally-reciprocating needle below the horn curved upward at its outer end and provided with a pivoted latch-plate on its upper side, the free end of which rests upon the extremity of said curved end, and means for reciprocating the needle, substantially as set forth.

WILLIAM A. DENN.

Witnesses:
HENRY K. COLEBAUGH,
WM. E. DUDLEY.